United States Patent [19]

Kawase et al.

[11] Patent Number: 5,657,083
[45] Date of Patent: Aug. 12, 1997

[54] VIDEO CAMERA HAVING PARTS ARRANGED TO REDUCE AFFECTS OF SHAKE

[75] Inventors: Kazuhiko Kawase; Hitoshi Narita, both of Kanagawa-ken; Michio Yoshida, Tokyo, all of Japan

[73] Assignee: Canon Kabushiki Kaisha, Tokyo, Japan

[21] Appl. No.: 310,032

[22] Filed: Sep. 21, 1994

Related U.S. Application Data

[63] Continuation of Ser. No. 40,391, Mar. 30, 1993, abandoned, which is a continuation of Ser. No. 755,114, Sep. 5, 1991, abandoned.

[51] Int. Cl.$^6$ ................................................. H04N 5/225
[52] U.S. Cl. ................................... 348/373; 348/207
[58] Field of Search ............................ 348/373, 374, 348/375, 376; 354/74, 288; 358/906, 335; D16/200, 202, 208, 211; 386/117, 118; H04N 5/225

[56] References Cited

U.S. PATENT DOCUMENTS

| | | | |
|---|---|---|---|
| D. 316,420 | 4/1991 | Tanaka | D16/202 |
| D. 327,286 | 6/1992 | Fukutomi | D16/202 |
| 4,550,343 | 10/1985 | Nakatani | 358/229 |
| 4,959,729 | 9/1990 | Fukuda et al. | 358/229 |
| 5,043,822 | 8/1991 | Ichiyoshi et al. | 358/229 |
| 5,347,307 | 9/1994 | Tanaka et al. | 348/372 |

FOREIGN PATENT DOCUMENTS

| | | | |
|---|---|---|---|
| 61-150474 | 7/1986 | Japan | H04N 5/225 |
| 2-26185 | 1/1990 | Japan | H04N 5/225 |
| 3-127560 | 5/1991 | Japan | H04N 5/225 |

*Primary Examiner*—Andrew Faile
*Assistant Examiner*—Tuan V. Ho
*Attorney, Agent, or Firm*—Robin, Blecker, Daley & Driscoll

[57] ABSTRACT

A video camera comprises a grip part for holding a camera body, and a mechanism part having a tape path forming part which forms a predetermined tape path for a magnetic tape. The mechanism part has a tape path forming plane approximately in parallel to a plane orthogonally intersecting the longitudinal direction of the grip part. The video camera further comprises two trigger switches for starting or stopping recording video information, and a zoom switch for varying the zoom ratio of a lens. The two trigger switches are positioned to be operable with the camera holding hand in a first camera holding posture and in a second camera holding posture, respectively. The zoom switch is positioned to be operable with the camera holding hand both in the first camera holding posture and in the second camera holding posture.

10 Claims, 8 Drawing Sheets

VIDEO CAMERA HAVING PARTS ARRANGED TO REDUCE AFFECTS OF SHAKE

This is a continuation application under 37 CFR 1.62 of prior application Ser. No. 08/040,391 filed on Mar. 30, 1993 (aban.) which is a cont. of Ser. No. 07/755,114 filed Sep. 5, 1991 (aban.)

BACKGROUND OF THE INVENTION

1. Field of the Invention

This invention relates to a small-sized video camera and more particularly to a specific positional relation of component elements of the video camera by which the adverse effects of camera shakes can be minimized.

2. Description of the Related Art

The video cameras of today are arranged to be very small and light in size and weight. Some of them on the market can be easily placed in a small bag.

In these small-sized video cameras, a positional relation between a trigger switch which is provided for a start and a stop of recording of information obtained through a lens on a recording medium which is loaded on the video camera and a zoom switch which is provided for varying the zoom ratio of the lens is as shown in FIG. 1 of the accompanying drawings. As shown, the trigger switch 11 is positioned to be pushable with the thumb and the zoom switch 12 to be pushable with the index and middle fingers, so that the camera can be operated with one hand.

However, with the video camera arranged in the above-stated manner, it is very difficult to operate the camera at a low angle in shooting an object from below or in shooting an object located in a low place. To solve this problem, some video cameras have been proposed to be arranged as follows:

(a) The trigger switch and the zoom switch are arranged on one and the same plane.

(b) In addition to the ordinary trigger switch, another trigger switch is provided on the front side of the video camera for low angle shooting.

(c) The camera is provided with a trigger switch and a zoom switch which are arranged for low angle shooting in addition to the ordinary trigger switch and the ordinary zoom switch.

However, the above-stated proposals (a), (b) and (c) have the following problems respectively:

(a) While these switches are positioned to permit low angle shooting, it is still difficult to operate switches disposed on one and the same plane, because they are not in sight during the process of shooting.

(b) During the low angle shooting, the trigger switch is operated by a left hand. However, since the left hand is used also to aid camera holding, the trigger switch operation with the left hand degrades camera holding stability and thus results in an image shake.

(c) The problem as to the operability of the camera can be eliminated by providing the low-angle shooting trigger and zoom switches in addition to the ordinary trigger and zoom switches. However, the provision of these additional switches brings forth another problem in connection with reduction in size and cost.

The most serious of the above-stated problems is the occurrence of the image shake. Therefore, a shooting image plane can be prevented from being affected by camera shakes by varying and controlling a position at which signals are read from an image sensor, a memory or the like of the video camera according to the degree and direction of the shakes or by resiliently buoying the optical system of the video camera from the camera body by means of a gimbals or a tripod head.

These camera shake preventing methods have effectively prevented the adverse effect of camera shakes. However, all these camera shake preventing methods are aimed only at the prevention of the shooting image plane from being affected by camera shakes. Meanwhile, no research has been conducted with regard to any adverse effect of the camera shakes on the precision mechanism parts of the video camera.

SUMMARY OF THE INVENTION

This invention is directed to the solution of the above-stated problems. It is, therefore, a principal object of the invention to provide a video camera which is arranged to eliminate all the adverse effects of camera shakes and to enhance the quality of images recorded.

To attain this object, a video camera which is arranged as an embodiment of the invention comprises: a grip part for holding a camera body; and a mechanism part which includes tape path forming means for forming a predetermined tape path for a magnetic tape, wherein a tape path forming plane at the mechanism part is arranged to be approximately in parallel to a plane orthogonally intersecting the longitudinal direction of the grip part.

The above-stated embodiment is capable of preventing the mechanism part from being affected by camera shakes due to the vibrations of the camera holding hand.

The results of studies have revealed that the hand vibrations introduced in the direction of height of the tape path formed by the tape path forming means and in the axial direction of a rotary drum which is approximately in parallel to the tape-path height direction bring about an adverse effect on the stable travel of the tape and the smooth rotation of the rotary drum. In a video camera, the tape path forming means is generally composed of guide rollers which are formed by fitting synthetic resin rollers on shafts. However, each of these rollers is axially displaceable to a very small degree. Therefore, the roller might be displaced by the vibrations taking place in the above-stated directions. Then, as a result, the height position of the tape might come to change.

In the case of an ordinary video camera having the tape path forming plane of a mechanism part approximately in parallel to the optical system thereof, the vibrations in the above-stated directions have been found to be vibrations taking place in a direction orthogonally intersecting the longitudinal direction of a grip part which is arranged approximately in parallel to the optical axis of the optical system.

Therefore, in the video camera according to this invention, the tape-path forming plane within the above-stated mechanism part is arranged to be approximately in parallel to a plane orthogonally intersecting longitudinally the direction of the grip part of the video camera. As a result of this arrangement, the above-stated vibrating direction is approximately made parallel with the chassis of the mechanism part, so that the vibrations in the height direction of the tape-path forming plane and the axial direction of the rotary drum can be minimized.

This arrangement thus enables the embodiment to minimize the adverse effect of the camera shakes due to hand vibrations on the mechanism part.

It is a second object of this invention to provide a video camera which not only meets the above-stated principal object of the invention but also improves the operability of the camera.

To attain the second object, a video camera arranged according to this invention as another embodiment thereof comprises: two trigger switches which are arranged to start and stop recording of video information; and a zoom switch which is provided for varying the zoom ratio of a lens. One of the two trigger switches is disposed in a position to be operable in a first camera holding posture and the other in a position to be operable in a second camera holding posture. The zoom switch is disposed in a position to be operable both in the first and second camera holding postures.

The above and further objects and features of this invention will become apparent from the following detailed description of embodiments thereof taken in connection with the accompanying drawings.

BRIEF DESCRIPTION OF THE DRAWINGS

FIG. 2(B) being a left side view; FIG. 2(C) being a front view; FIG. 2(D) being a rear elevation; FIG. 2(E) being a plan view; and FIG. 2(F) being a bottom plan view.

DETAILED DESCRIPTION OF THE PREFERRED EMBODIMENTS

The following describes, with reference to the drawings, the details of video cameras arranged according to this invention as preferred embodiments thereof.
(First Embodiment)

Figure 1:
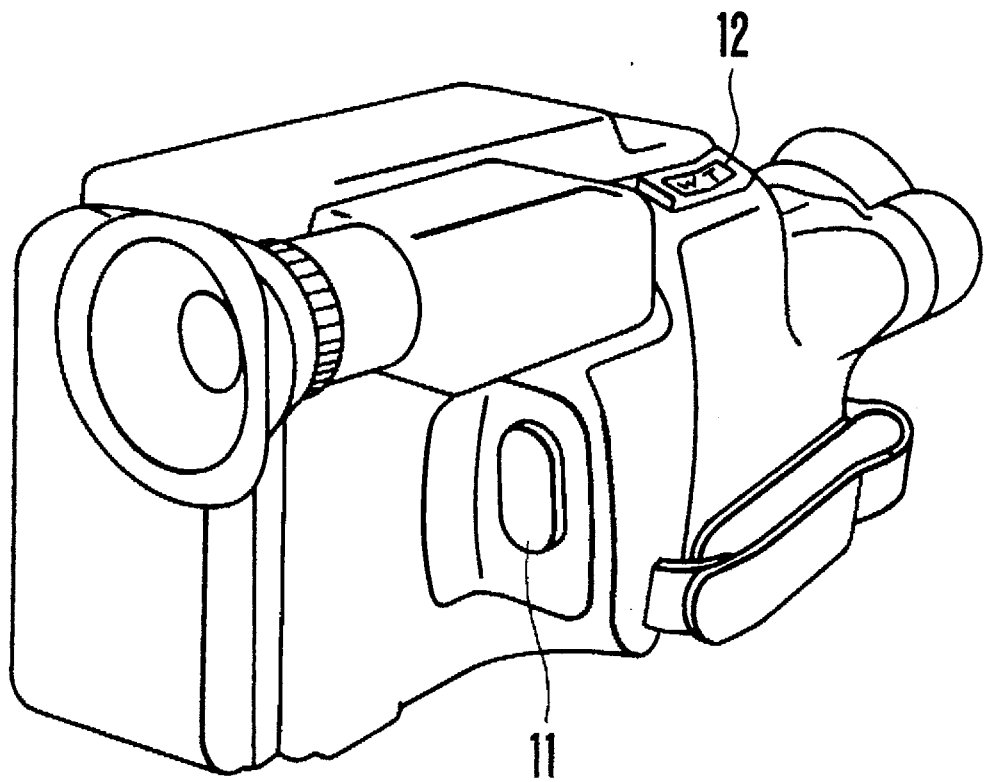
FIG. 1 is an oblique view showing the video camera of the prior art.
Figure 2A:
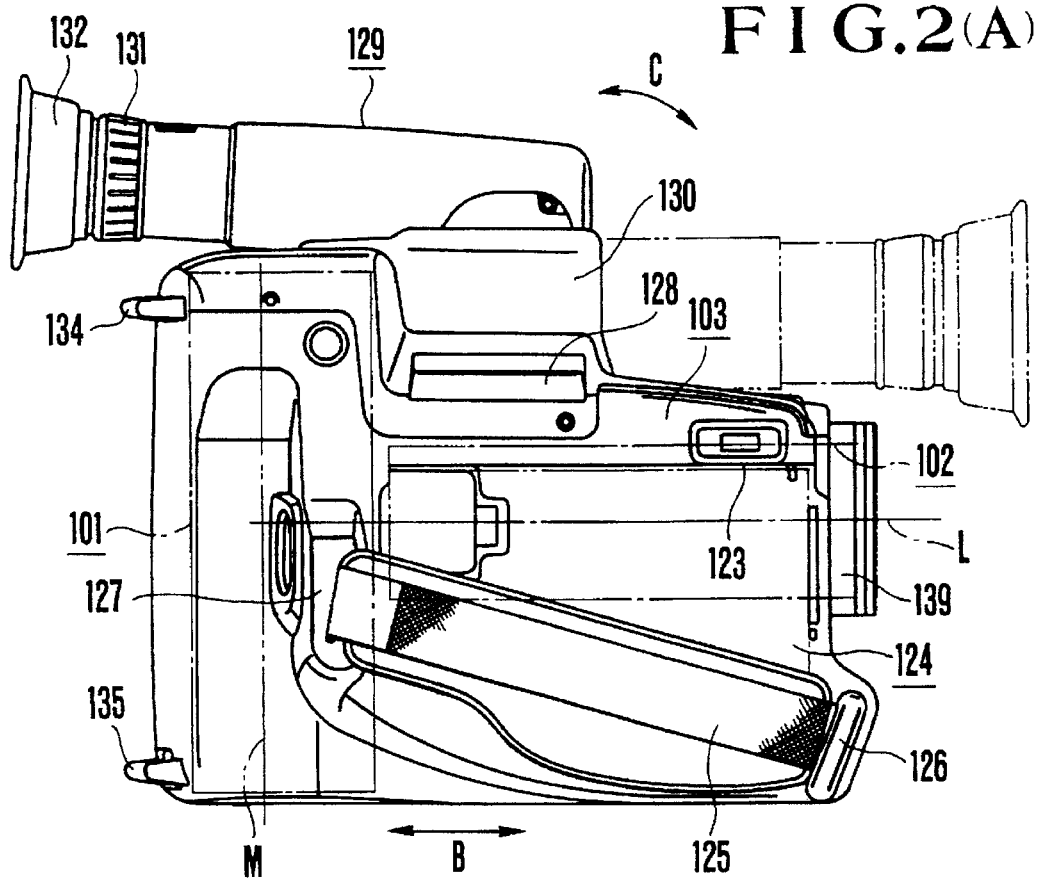
FIGS. 2(A) to 2(F) show a video camera which is arranged according to this invention as a first embodiment thereof, FIG. 2(A) being a right side view.

Referring to FIGS. 2(A) to 2(F) and 3, a first embodiment of the invention is described as follows:

FIG. 2(A) is a right side view of a video camera which is arranged as the first embodiment. As shown, a mechanism part 101 and an optical system 102 are disposed within the body of the camera. A grip part 103 is formed on the right side of the camera body.

Figure 3:
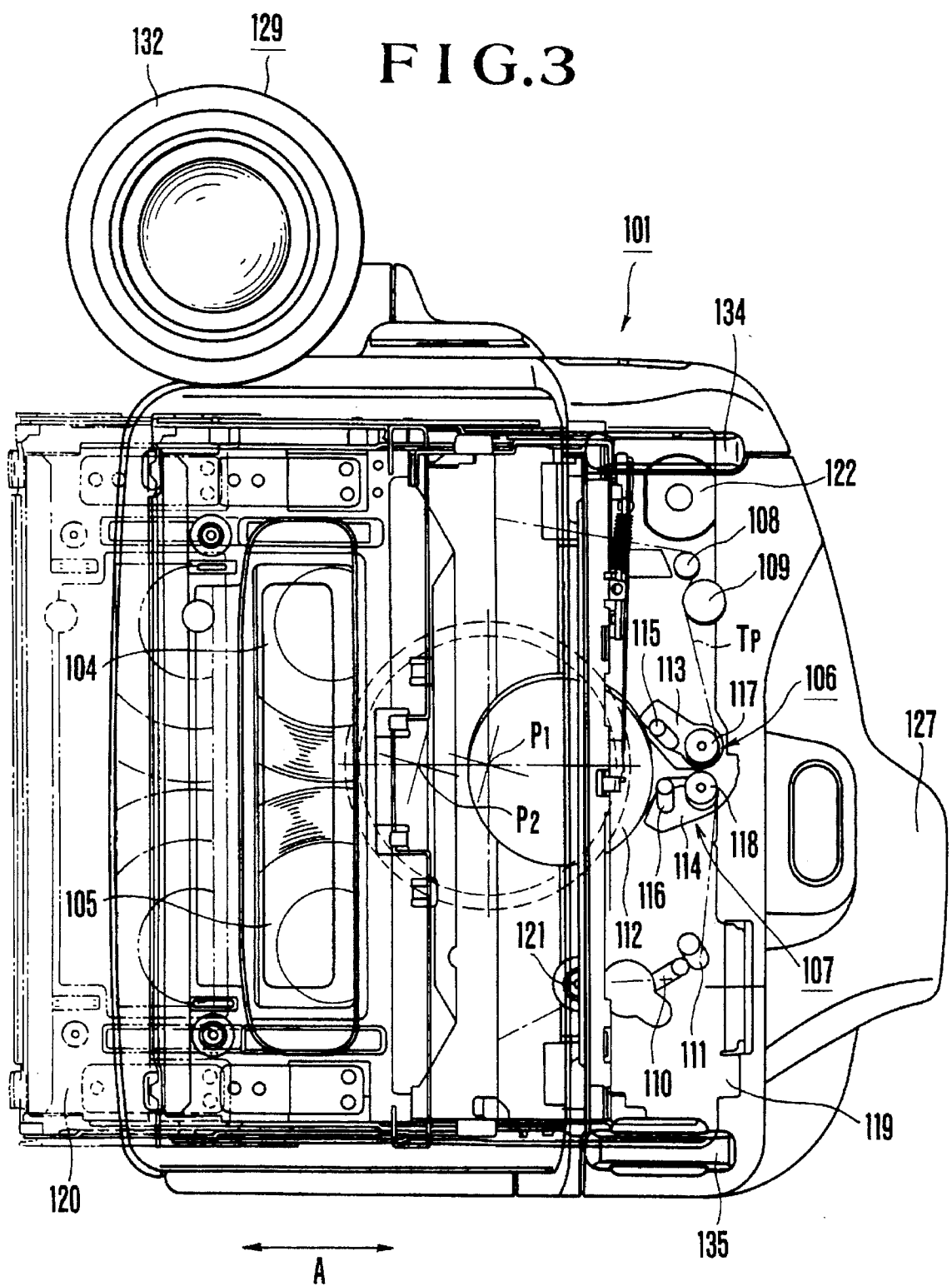
FIG. 3 is a plan view showing the arrangement of a mechanism part of the first embodiment and corresponds to the rear elevation of FIG. 2(D).

As shown in FIG. 3, the mechanism part 101 includes the following members: a pair of loading members 106 and 107 which are provided for pulling a magnetic tape Tp out from a tape cassette to the inside of the mechanism part 101, the tape Tp being stowed in the tape cassette in a state of being wound around a pair of rotatable tape reels 104 and 105; a tape-path forming means consisting of tape guides 108, 109, 110 and 111 which are provided for forming a predetermined tape path by contacting the respective tape portions pulled out in the longitudinal direction of the magnetic tape Tp; and a rotary drum 112 which has a magnetic head mounted thereon and is arranged to have the tape path portion of the magnetic tape wrapped about 270 degrees around the rotary drum 112.

The pair of loading members 106 and 107 respectively consist of tape guides 115 and 116 and guide rollers 117 and 118 which are provided on loading plates 113 and 114. The tape-path forming means and the rotary drum 112 are disposed on a stationary chassis 119 or a movable chassis 120 which is arranged to be slidable in the direction of arrow A relative to the stationary chassis 119. The tape-path forming means is arranged to form a tape path within a plane which is approximately in parallel to the surfaces of this chassis.

The magnetic tape Tp which is set in the tape path is arranged to be caused to travel in a given direction by the rotation of a pinch roller 121 which is provided in the tape path and by the rotation of each of the tape reels 104 and 105 arranged to be driven by reel motors which are not shown.

Further, in FIG. 3, a reference numeral 122 denotes a loading motor. The rotatory driving force of the loading motor 122 is arranged to move the loading members 106 and 107 between a loading start position which corresponds to the tape within the cassette and a loading completion position which is indicated with a full line in FIG. 3. The rotatory driving force of the loading motor 122 is further arranged to move the above-stated movable chassis 120 between a cassette inserting and removing position which is as indicated with a broken line and a cassette loading completion position which is as indicated with a full line.

In the case of this embodiment, the tape-path forming plane which is within the mechanism part 101 is arranged to nearly orthogonally intersect the optical axis L of the optical system 102 (FIG. 2(A)). Further, an intersection point P1 between the optical axis L and the tape-path forming plane is arranged to approximately coincide with the center of gravity P2 of the mechanism part 101 obtained on the tape-path forming plane.

This arrangement prevents the optical system 102 from readily having a torque around the axis thereof, so that the occurrence of camera shakes due to hand vibrations can be suppressed.

Further, on the right side of the video camera, there is provided a battery loading part 123 which is disposed almost right beside the optical system 102 and extends approximately in parallel to the optical axis L of the optical system 102. The battery loading part 123 is arranged to allow a battery 124 of a rectangular shape to be attached to and detached from the loading part 123.

In the case of this embodiment, the battery 124 which is thus attached to the battery loading part 123 forms a portion of the grip part 103.

This grip part 103 is approximately in parallel to the optical system 102. One side face of the grip part 103 which orthogonally intersects the longitudinal direction of the grip part 103 (the direction of arrow B shown in FIG. 2(A)) is approximately in parallel to the tape-path forming plane M of the above-stated mechanism part 101.

As described above, in the case of this embodiment, the face of the grip part 103 which orthogonally intersects the longitudinal direction of the grip part 103 is arranged to be approximately in parallel to the tape-path forming plane of the mechanism part 101. That arrangement effectively prevents the occurrence of camera shakes in the direction of the height of the above-stated tape path, i.e., in the direction of the width of the magnetic tape or in the axial direction of the rotary drum 112 in the event of occurrence of vibrations in the direction orthogonally intersecting the longitudinal direction of the grip part 103.

Therefore, the mechanism part can be saved from such adverse effects of camera shakes as the stable travel of the tape being hindered by the deviation of the tape path in the direction of its height and the smooth rotation of the rotary drum being hindered by a slight axial displacement of the rotary drum.

Referring again to FIG. 2(A), a grip belt 125 has both of its ends secured to attaching parts 126 and 127 which are formed integrally with the camera body. In shooting, the back of the hand is supported by the grip belt 125. The video camera can be securely held by holding the grip part 103 with the aid of the grip belt 125.

The grip part 103 is located almost right beside the optical system 102 as mentioned in the foregoing. Therefore, compared with a case where the grip part 103 is located away from the optical system 102, this location of the grip part 103 allows the optical system 102 to be affected to a less degree by camera shakes.

In the drawings, a reference numeral 128 denotes an operation switch for power zooming. This operation switch 128 consists of a telephoto operation part and a wide-angle operation part which are disposed in positions to be easily operable respectively with the index and middle fingers of the right hand with the grip part 103 grasped with the right hand.

A reference numeral 129 denotes an electronic viewfinder. The lower part of the viewfinder 129 on the base end side thereof is carried by a viewfinder mount part 130 of the camera body through a hinge mechanism which is not shown in such a way as to be turnable in the direction of arrow C. On the fore end of the viewfinder 129 are mounted a diopter adjustment ring 131 and an eyecup 132. The mount position of the viewfinder 129 which is, as mentioned above, the center of rotation relative to the camera body is arranged to be in the lower part as viewed on the drawing. Therefore, when the viewfinder 129 is turned into its stowed position, as indicated with one-dot chain lines in FIG. 2(A), the lower side of the viewfinder 129 is approximately on the same plane as the upper surface of the camera body. The stowing space of the camera as a whole can be reduced by virtue of this arrangement.

Figure 2B:
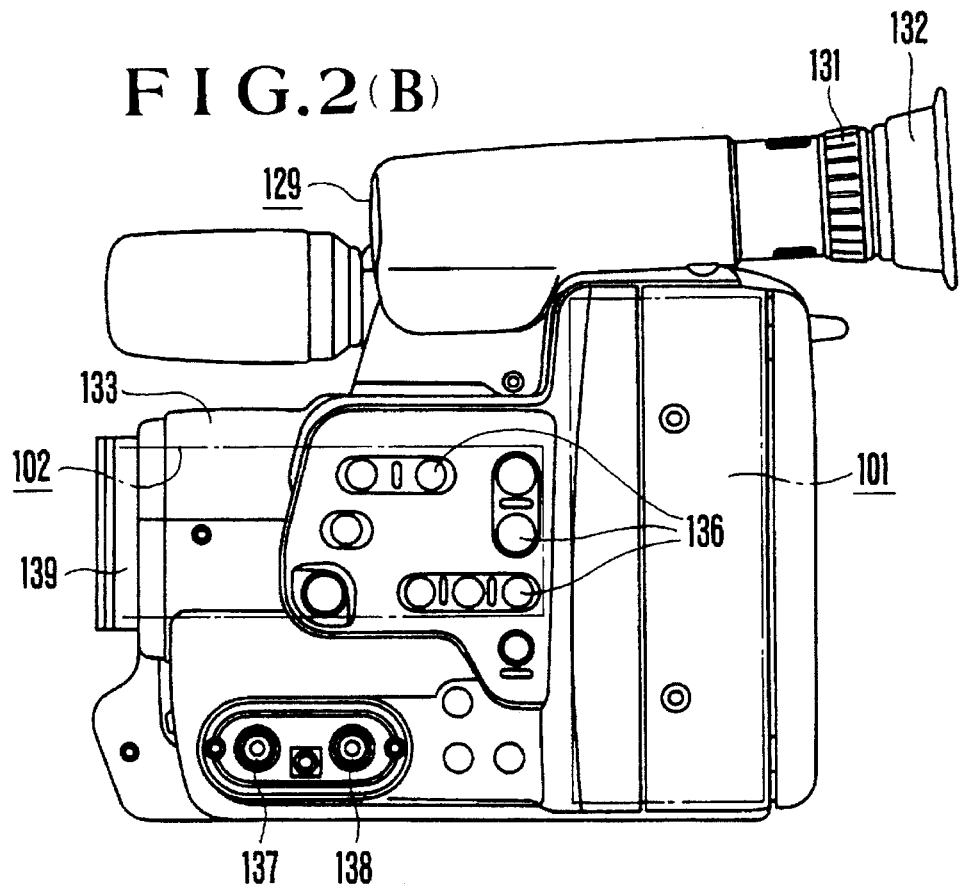
Figure 2C:
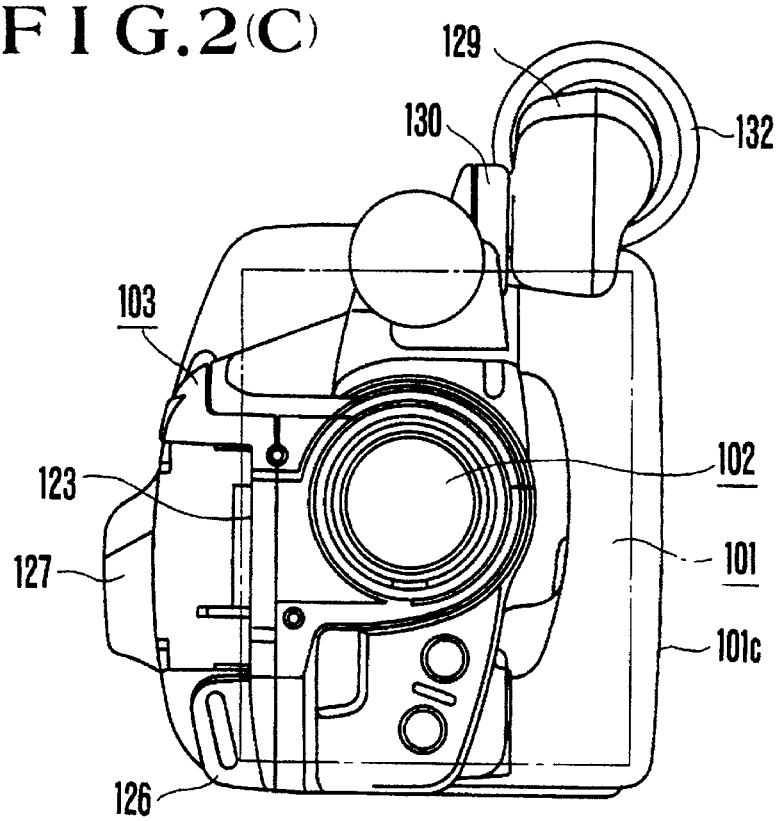
Figure 2D:
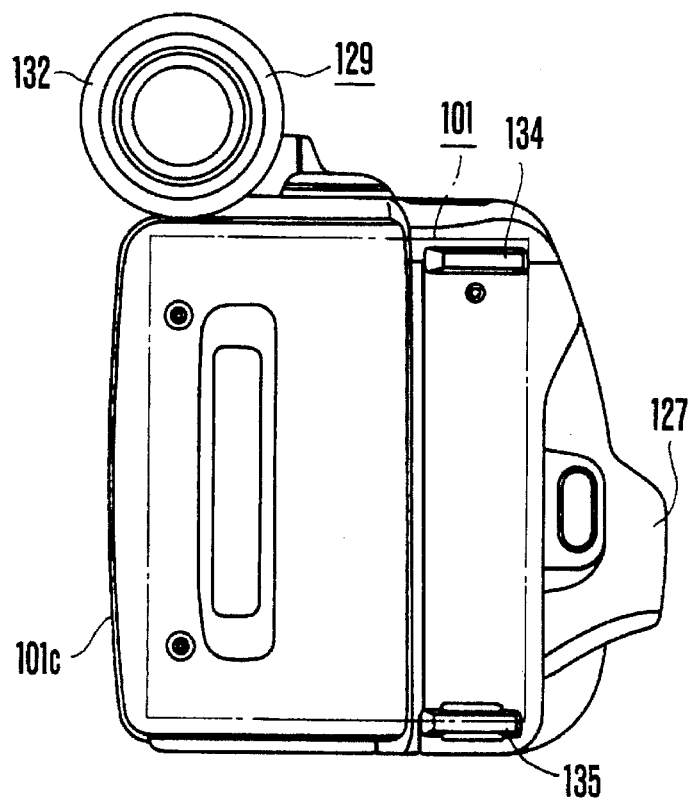
Figure 2E:
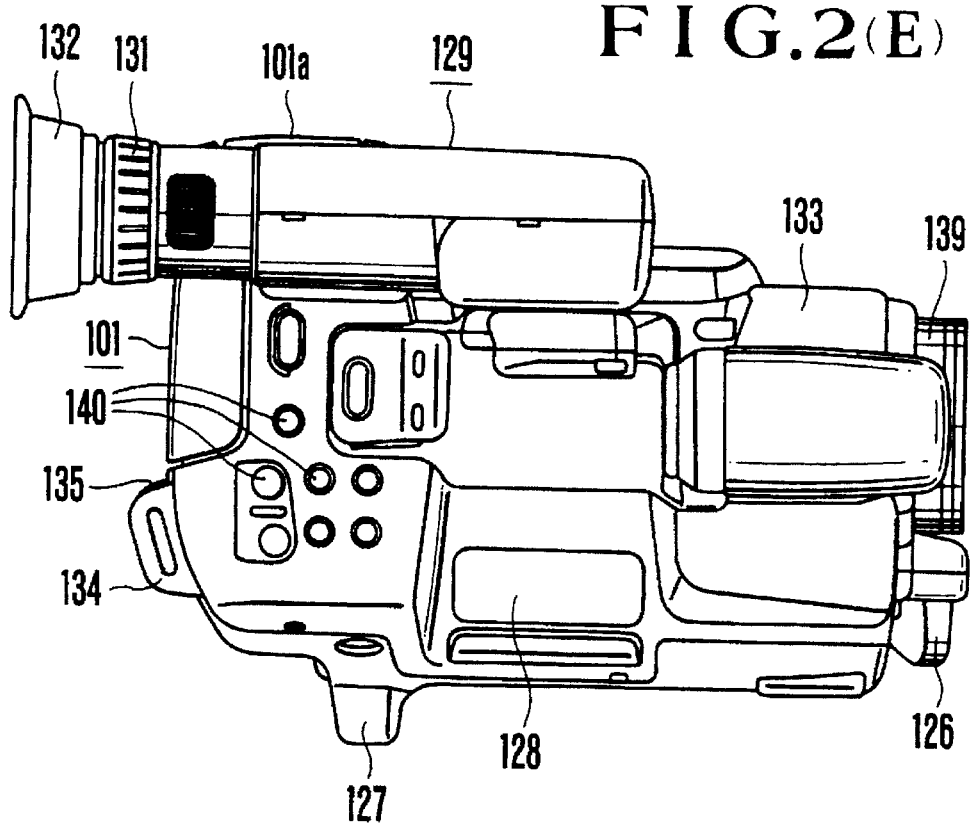
Figure 2F:
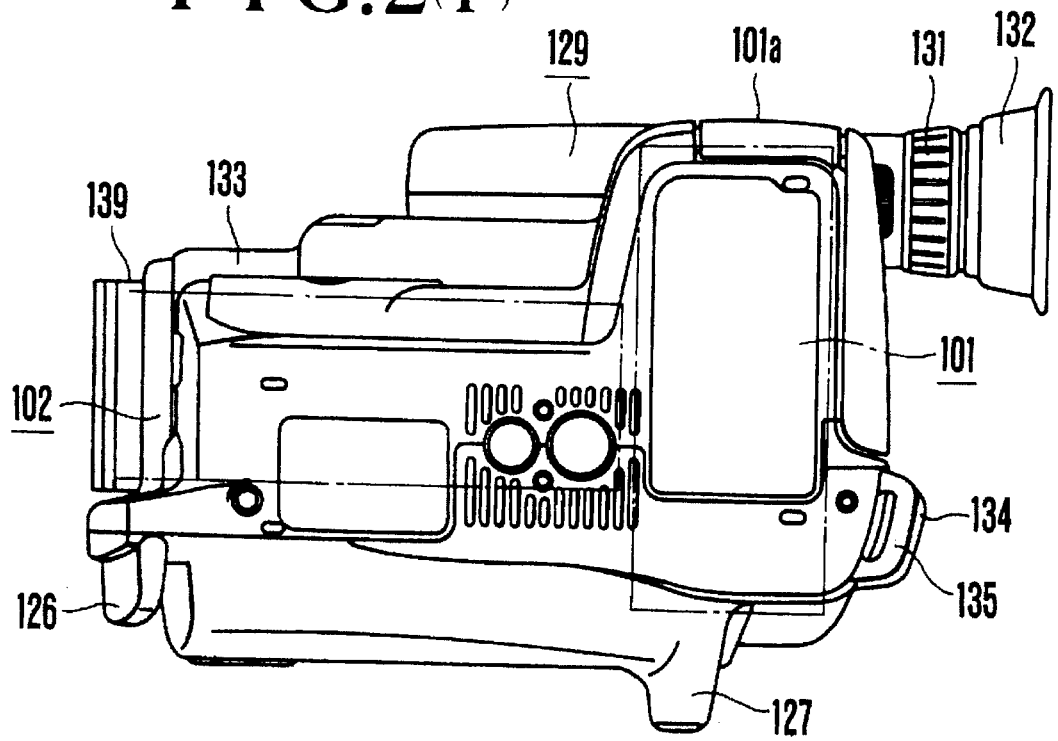

Further, as shown in FIGS. 2(E) and 2(F), the plane figures of the mechanism part 101 and a lens barrel 133 of the video camera present approximately an uncinate shape. A side surface 101a (left side face 101c) of the mechanism part 101 which protrudes from the lens barrel 133 is nearly flush with the side surface of the viewfinder 129. When the video camera is stowed, therefore, the side surface of the viewfinder 129 can be protected by the side surface 101a of the mechanism part 101.

With the plane figures of the video camera in the uncinate shape as mentioned above, there are not many protruding parts within a part from the rear side (left side as viewed on FIG. 2(E)) to the right side (lower side as viewed on FIG. 2(E)). Besides, an angle formed by the rear side surface and the right side surface is nearly rectangular. Therefore, in stowing the video camera in a bag such as a traveling bag, for example, the camera can be easily fitted into a corner space of the bag.

Further, as shown in FIGS. 2(C), 2(D), 2(E) and 2(F), the attaching parts 126 and 127 provided for attaching the grip belt 125 to the right side surface of the camera body are formed to protrude from this side surface. Meanwhile, attaching parts 134 and 135 which are provided for attaching a shoulder belt are formed to protrude from the rear surface of the camera body. The protruding parts 126, 127, 134 and 135 effectively protect these surfaces.

As shown in FIG. 2(B), operation switches 136 of varied kinds including a white balance adjustment switch and others are arranged within a given area on the outside surface of the above-stated lens barrel 133. Output terminals 137 and 138 are also arranged there. These output terminals 137 and 138 are provided with a cover which protects them from the intrusion of dust while they are not used. A reference numeral 139 denotes a focus ring which is provided for focus adjustment to be made in carrying out a manual focusing operation.

As shown in FIG. 2(E), on the upper surface of the video camera, there are provided other operation switches 140 of varied kinds including a reproduction switch and others which are arranged to permit the use of the video camera as a video deck.

In the case of this embodiment, as described above, the operation switches 136 and 140 are divided according to their purposes of use and are arranged in groups on different external surfaces in such a way as to prevent a faulty operation and to facilitate operations on these switches.

Further, in the case of this embodiment, the mechanism part 101 is arranged approximately in the direction of orthogonally intersecting the optical system 102 and is thus arranged sideways relative to the longitudinal direction of the video camera. The longitudinal dimension of the video camera is shortened by this arrangement. Another advantage of this arrangement resides that the center of gravity in the longitudinal direction of the camera as a whole can be set closer to its front, i.e., on the right side of the camera as viewed in FIG. 2(A). Therefore, the grip part 103 can be arranged almost right beside the optical system 102. Compared with a case where the optical system 102 is located away from the grip part 103, the embodiment is less affected by camera shakes (due to the vibrations of camera holding hand).

As is apparent from the foregoing description, in this embodiment, the tape-path forming plane of the mechanism part is arranged to be approximately in parallel to a plane orthogonally intersecting the longitudinal direction of the grip part of the video camera. As a result, the direction of the vibrations which are detrimental to the mechanism part is nearly in parallel with the chassis of the mechanism part. Therefore, vibrations can be lessened in the direction of the height of the tape path and the axial direction of the rotary drum which approximately orthogonally intersects the direction of the above-stated detrimental vibrations. The adverse effect of the camera shakes on the mechanism part thus can be minimized in accordance with the arrangement of the embodiment.

(Second Embodiment)

Figure 4:
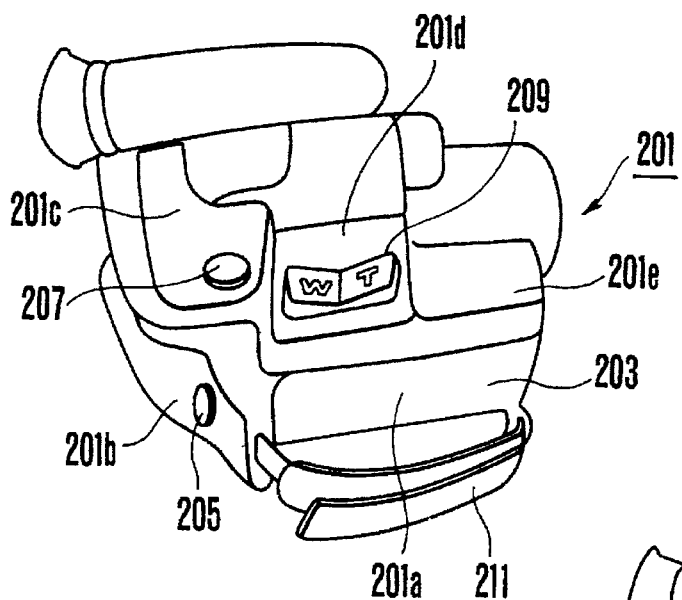
FIG. 4 is an oblique view showing a second embodiment of this invention.

A video camera which is arranged according to this invention as a second embodiment thereof is described below with reference to the accompanying drawings:

Referring to FIG. 4 which shows the second embodiment in an oblique view, a grip 203 for holding the camera body 201 is formed mainly on one side part 201a of a video camera body 201. Meanwhile, a rear surface part 201b is formed in a slightly stepped shape in such a way as to allow the thumb of the hand to be easily placed there. In a lower part of the rear surface part 201b is disposed a first trigger switch 205 which is arranged to start and stop a recording action of a recorder for ordinary shooting. The upper surface part of the video camera is formed in three steps. In a first upper surface part 201c, which is the highest of the three steps, is disposed a second trigger switch 207. The second trigger switch 207 is arranged to start or stop the recording action in the event of low-angle shooting. A zoom switch 209 which is provided for changing the zoom ratio of the lens is disposed in a second upper surface part 201d which is the second of the three steps. A third upper surface part 201e has nothing there and is formed in such a manner that the third and little fingers which are not used for ordinary shooting are allowed to be placed there. Further, in a lower part of the side part 201a, is disposed a grip belt 211 which is arranged to prevent the camera body 201 from being dropped off the hand when the holding force of the hand on the camera body 201 is eased up.

Next, the manner in which the camera is held and operated in ordinary shooting and low-angle shooting are described below with reference to FIGS. 5 and 6.

Figure 5:
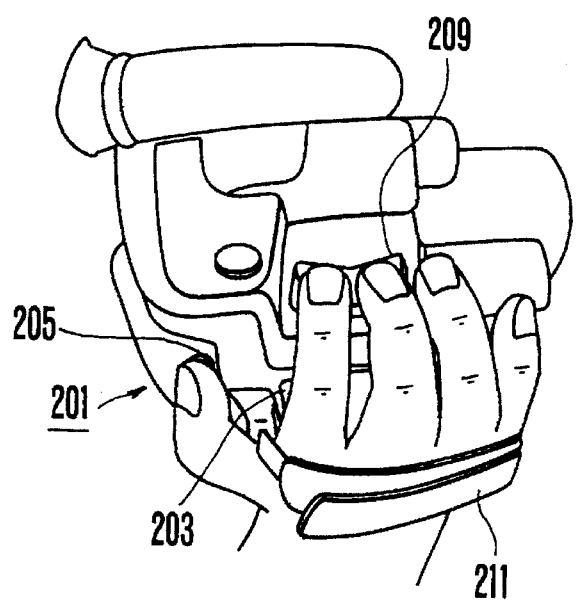
FIG. 5 shows the video camera of the second embodiment as in a state of being grasped and operated for ordinary shooting.

In ordinary shooting, the camera body 201 is held by inserting the four fingers other than the thumb in between the grip 203 and the grip belt 211 as shown in FIG. 5. The first trigger switch 205 is operated with the thumb and the zoom switch 209 with the index and middle fingers.

Figure 6:
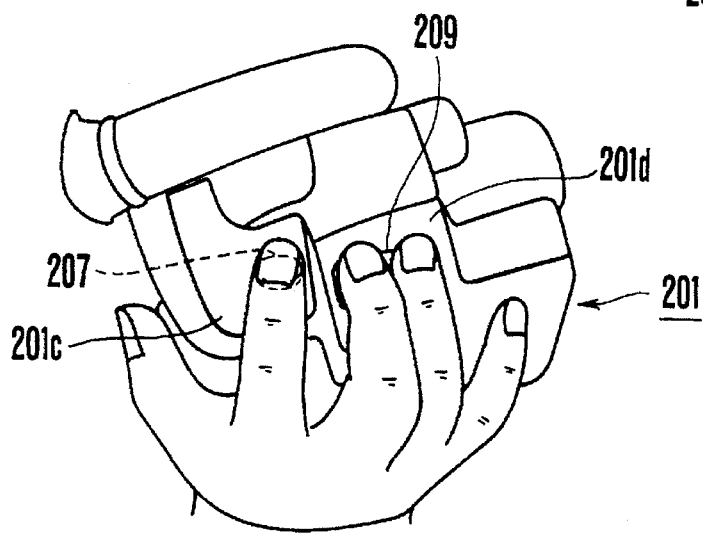
FIG. 6 shows the same video camera as in a state of being grasped and operated for low angle shooting.

In the case of low-angle shooting, as shown in FIG. 6, the camera is held in such a way as to embrace the upper part of the camera body 201. In this case, the second trigger switch 207 is operated with the index finger while the zoom switch 209 is operated with the middle and third fingers. Since the second trigger switch 207 is located on the first upper surface part 201c, which has a step difference from the second upper surface part 201d, the switch 207 can be correctly operated without fail.

While the second embodiment of this invention is arranged in the manner as described above, it is conceivable that the first and second trigger switches 205 and 207 may be disposed in various positions other than the above-stated positions (FIG. 4). For example, if the second trigger switch 207 is positioned in a somewhat raised part of the rear side surface part 201b of the camera body 201, the trigger switch can be operated only with the thumb while the other fingers are used for operating only the zoom switch. Further, if the two trigger switches 205 and 207 are disposed in the first upper surface part 201c and the third upper surface part 201e respectively, the thumb is allowed to be used only for holding the camera body 201, so that the stability of the hold on the camera can be increased.

Figure 7:
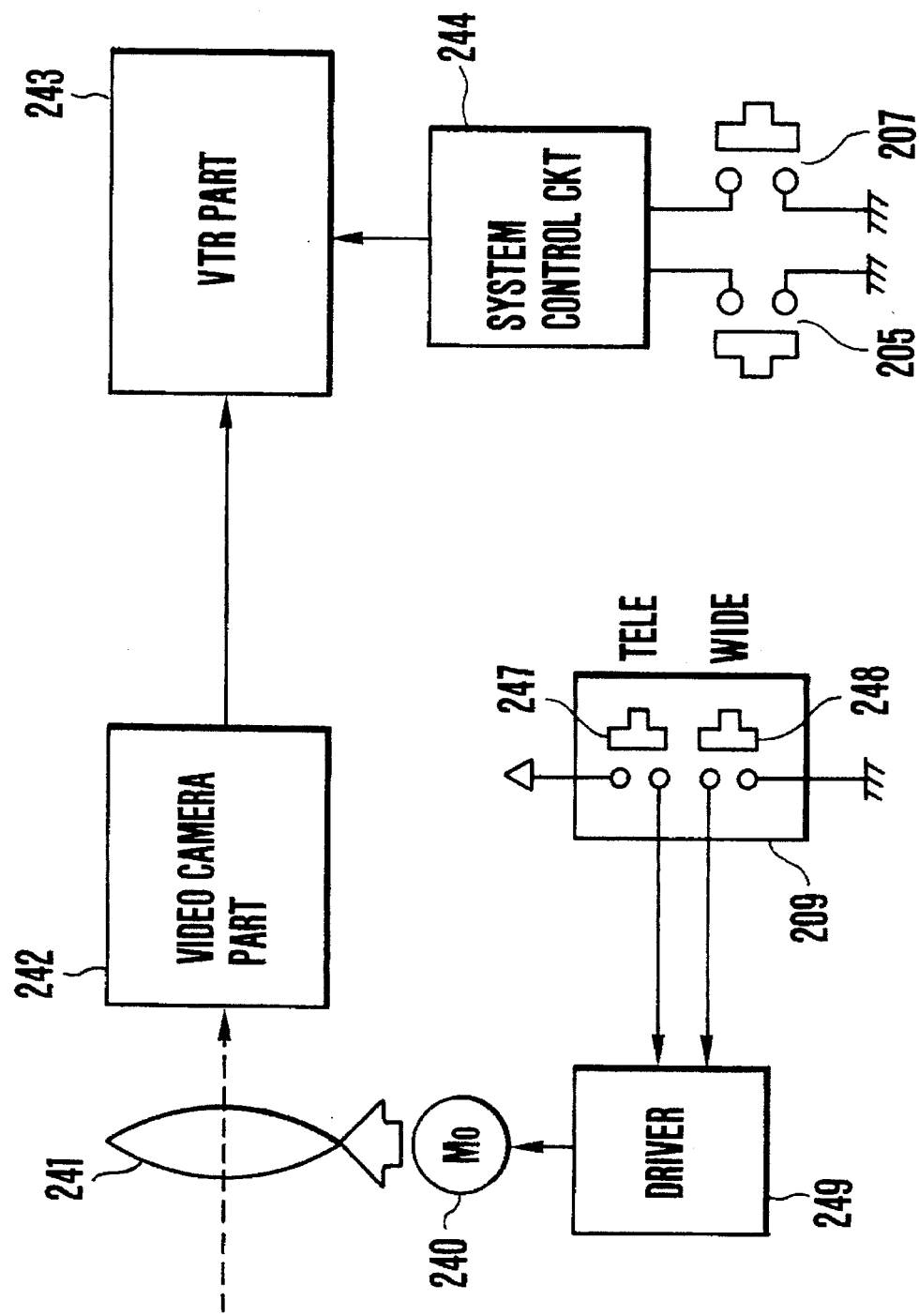
FIG. 7 is a block diagram showing the arrangement of the second embodiment.

Next, the electrical arrangement of this (the second) embodiment is described below with reference to FIG. 7 which is a block diagram.

The incident light of an object obtained through an optical system 241 is photo-electrically converted by a video camera part 242 to be processed as a video signal. The video signal thus processed is recorded by a VTR part 243. A start and a stop of recording are controlled by a system control circuit 244 on the basis of a signal coming from the first or second trigger switch 205 or 207. The zoom switch 209 consists of a telephoto switch 247 and a wide-angle switch 248. The position of the optical system 241 is controlled through a driver 249 by a motor 240 to move in the direction designated by the switch 247 or 248, whichever is pushed.

Figure 8:
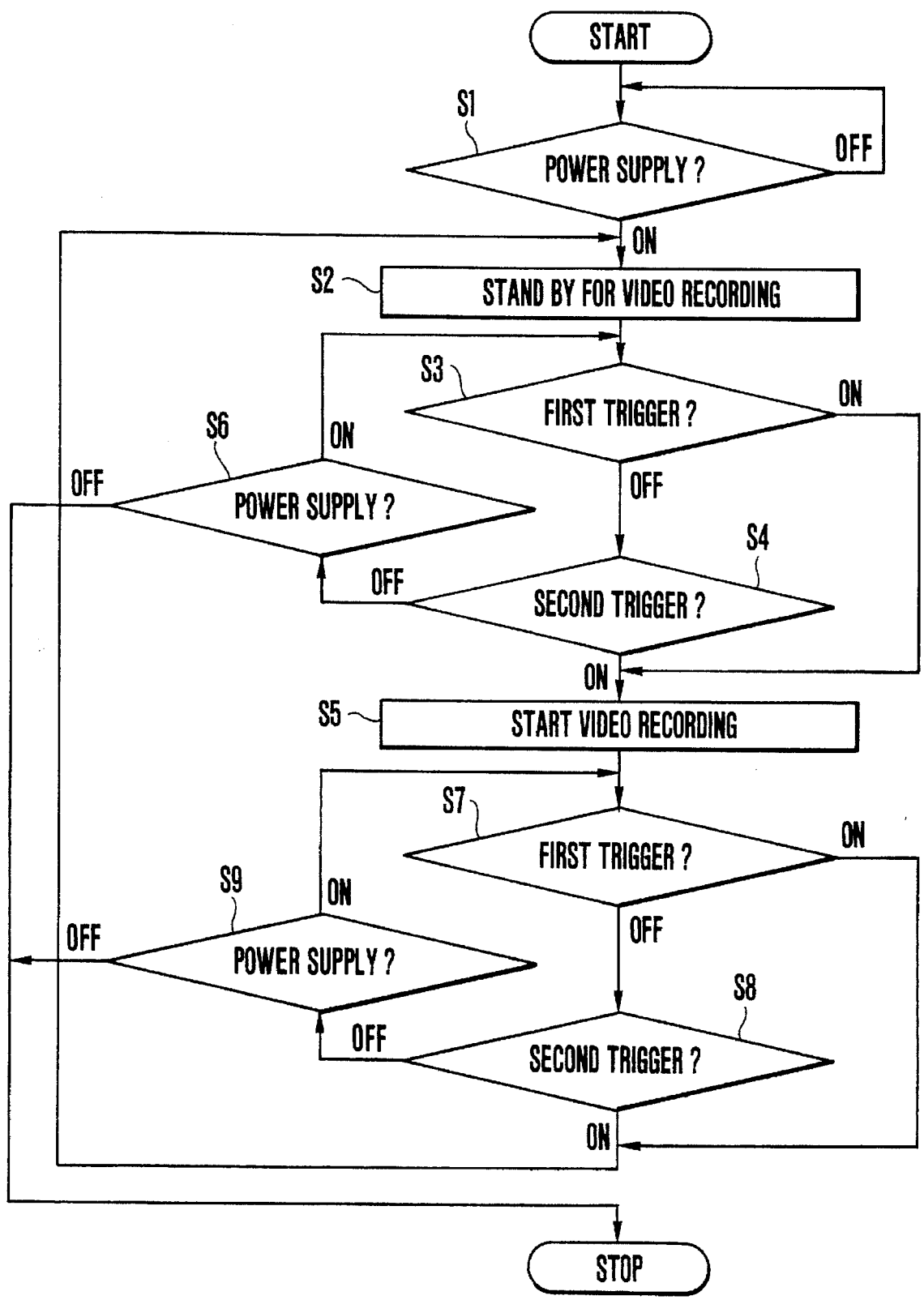
FIG. 8 is a flow chart showing a method for controlling a start and a stop of recording to be carried out with the second embodiment.

A method by which the system control circuit 244 controls a start and a stop of recording is described below with reference to FIG. 8 which is a flow chart.

When a power supply is turned on at a step S1, there obtains a recording standby state at a step S2. Under this condition, the first trigger switch or the second trigger switch is turned on at a step S3 or S4. Recording then begins at a step S5. After commencement of recording, when the first or second trigger switch is turned on at a step S7 or S8, the embodiment comes back to the recording standby state. Further, if the first or second trigger switch is turned off at the step S3 or S4 (S7 or S8) and the power supply is turned off at step S6 or S9 in the recording standby state at the step S2 or in the recording state at the step S5, the operation comes to an end.

As is apparent from the foregoing description, the embodiment is arranged to have trigger switches disposed respectively in a position where the video camera is operable in a first camera holding posture and also in another position where the video camera is operable in a second camera holding posture. Meanwhile, the zoom switch is disposed in a position where the video camera is operable with the camera holding (or grasping) hand both in the first camera holding posture or in the second camera holding posture. This switch arrangement thus enables the camera to be supported by the hand other than the camera grasping hand under any camera holding posture. Besides, since the switch operation can be carried out solely with the camera grasping hand, the arrangement of the embodiment not only effectively prevents camera shakes caused by hand vibrations while the camera is under operation but also greatly enhances the operability of the video camera.

Another advantage of the embodiment lies in that the arrangement to position the zoom switch to be operable both in the first and second camera holding postures contributes to a reduction in size of the video camera.

What is claimed is:

1. A video camera comprising:
   a) a camera casing;
   b) an image sensing optical system disposed within said camera casing;
   c) a grip part for holding said camera casing, the longitudinal direction of said grip part being always parallel to an optical axis of the image sensing optical system; and
   d) a mechanism part which intersects with an optical axis of the image sensing optical system and disposed within said camera casing, said mechanism part having tape path forming means for forming a predetermined tape path for a magnetic tape, said tape path forming means moving in parallel to a plane orthogonally intersecting the longitudinal direction of said grip part, an intersection point between the optical axis and a tape-path forming plane being arranged close to a center of gravity of the mechanism part obtained on the tape-path forming plane.

2. A video camera according to claim 1, wherein the longitudinal direction of said grip part is in the same direction as an optical axis of said image sensing optical system.

3. A video camera according to claim 2, wherein said grip part is located approximately right beside said image sensing optical system.

4. A video camera according to claim 3, wherein an intersection point between the optical axis of said image sensing optical system and said tape path forming plane approximately coincides with the position of the center of gravity of said mechanism part obtained on said tape path forming plane.

5. A video camera according to claim 2, wherein an intersection point between the optical axis of said image sensing optical system and said tape path forming plane approximately coincides with the position of the center of gravity of said mechanism part obtained on said tape path forming plane.

6. A video camera according to claim 1, wherein the magnetic tape is stowed in a cassette.

7. A video camera according to claim 5, wherein the cassette is inserted into said mechanism part from one side of said mechanism part located opposite to a side on which said grip part is disposed.

8. A video camera comprising:

a) a camera casing;

b) an image sensing optical system disposed within said camera casing;

c) a mechanism part which intersects with an optical axis of the image sensing optical system and disposed within said camera casing, said mechanism part having tape path forming means for forming a predetermined tape path for a magnetic tape, said tape path forming means moving on a plane orthogonally intersecting the optical axis direction of said image sensing optical system, an intersection point between the optical axis and a tape-path forming plane being arranged close to a center of gravity of the mechanism part obtained on the tape-path forming plane.

9. A video camera according to claim 8, wherein the magnetic tape is stowed in a cassette.

10. A video camera according to claim 9, wherein the cassette is inserted into said mechanism part from the direction orthogonally intersecting the optical axis direction of said image sensing optical system.

\* \* \* \* \*

UNITED STATES PATENT AND TRADEMARK OFFICE
CERTIFICATE OF CORRECTION

PATENT NO. : 5,657,083
DATED : August 12, 1997
INVENTOR(S) : Kawase et al.

It is certified that error appears in the above-identified patent and that said Letters Patent is hereby corrected as shown below:

Col. 8, line 64, delete "claim 5" and insert -- claim 6 --.

Signed and Sealed this

Twenty-sixth Day of May, 1998

Attest:

BRUCE LEHMAN

Attesting Officer                Commissioner of Patents and Trademarks